(12) United States Patent
Viscardi

(10) Patent No.: US 9,975,265 B2
(45) Date of Patent: May 22, 2018

(54) METHOD FOR MANUFACTURING, CHAIN SUB-UNITS AND MACHINE

(71) Applicant: COSBERG S.p.A., Terno D'Isola, Bergamo (IT)

(72) Inventor: Gianluigi Carlo Viscardi, Bergamo (IT)

(73) Assignee: COSBERG S.p.A., Terno D'Isola, Bergamo (IT)

( * ) Notice: Subject to any disclaimer, the term of this patent is extended or adjusted under 35 U.S.C. 154(b) by 0 days. days.

(21) Appl. No.: 15/508,422

(22) PCT Filed: Aug. 17, 2015

(86) PCT No.: PCT/IB2015/056253
§ 371 (c)(1),
(2) Date: Mar. 2, 2017

(87) PCT Pub. No.: WO2016/034966
PCT Pub. Date: Mar. 10, 2016

(65) Prior Publication Data
US 2017/0282398 A1 Oct. 5, 2017

(30) Foreign Application Priority Data
Sep. 3, 2014 (IT) .................. 102014902290369

(51) Int. Cl.
B27B 33/14 (2006.01)
B21L 9/06 (2006.01)

(52) U.S. Cl.
CPC ............ *B27B 33/148* (2013.01); *B21L 9/065* (2013.01); *Y10T 83/909* (2015.04)

(58) Field of Classification Search
CPC ...... Y10T 83/04; Y10T 83/909; Y10T 83/913; B27L 333/148; B27L 333/14;
(Continued)

(56) References Cited

U.S. PATENT DOCUMENTS 4,750,395 A    6/1988  Doiron
5,651,938 A *  7/1997  Thomson ............... B27B 33/14
                                                    420/119

(Continued)

FOREIGN PATENT DOCUMENTS

GB      888 980 A    2/1962
GB    2 109 455 A    6/1983

OTHER PUBLICATIONS

International Search Report and Written Opinion of the International Searching Authority for corresponding International Patent Application No. PCT/IB2015/056253 dated Jan. 4, 2016, 8 pgs.

*Primary Examiner* — Phong Nguyen
(74) *Attorney, Agent, or Firm* — Merchant & Gould P.C.

(57) ABSTRACT

A method of manufacturing a chain (1), such as a cutting chain for a chain saw, includes providing or pre-assembling a plurality of chain sub-units (10). At least a sufficient property and/or a sufficient functionality of each chain sub-unit (10) are tested. A head-to-tail coupling is combined with the plurality of chain sub-units (10) provided with the sufficient property and/or sufficient functionality of the testing step to make a chain (1) of a predefined length.

13 Claims, 3 Drawing Sheets

(58) Field of Classification Search
CPC ............. B27L 333/142; B27L 333/144; B27L 333/145; B27L 17/00; B21L 9/065; B21L 9/00

See application file for complete search history.

(56) References Cited

U.S. PATENT DOCUMENTS

| | | | |
|---|---|---|---|
| 6,435,070 B1* | 8/2002 | Weber .................. | B23D 63/168 83/830 |
| 2007/0169605 A1* | 7/2007 | Szymanski ............ | B23D 61/06 83/834 |
| 2011/0226112 A1* | 9/2011 | Englund ................. | B27B 33/14 83/830 |
| 2014/0090631 A1 | 4/2014 | Michelon | |

* cited by examiner

METHOD FOR MANUFACTURING, CHAIN SUB-UNITS AND MACHINE

This application is a National Stage Application of PCT/IB2015/056253, filed 17 Aug. 2015, which claims benefit of Ser. No. 102014902290369, filed 3 Sep. 2014 in Italy and which applications are incorporated herein by reference. To the extent appropriate, a claim of priority is made to each of the above disclosed applications.

BACKGROUND OF THE INVENTION

This invention relates to a method for the manufacture of a chain, a machine for the implementation of such a method, and a chain sub-unit obtained by the steps of the above-mentioned method.

The conventional process for manufacturing a chain, for example for a chain saw, provides for its elongation by the progressive connection of the various modular elements to one end thereof. E.g. each of the documents GB 2 109 455 A, US 2014/090631 A1, GB 888 980 A show such conventional connection method.

For this reason, each element or chain member to be assembled is joined to a chain of a certain length, which becomes increasingly longer as its manufacture proceeds.

However, the main problem of this methodology consists of the possible errors that can be committed in the assembly of each successive modular element.

More precisely, any defects in the connections between the elements that comprise the chain are not readily identifiable, since the related characteristics and/or functionalities may only emerge when it is too late to remedy the situation.

It follows that, after the detection of the assembly error, one is faced with the two alternatives of discarding portions of chain of considerable length or, in order to limit waste of material, of laboriously restoring the compromised characteristic and/or functionality, for example by severing the elements of the chain involved and reconnecting the pieces.

SUMMARY OF THE INVENTION

This invention therefore is placed in the previous context, proposing to provide a new method for manufacturing a chain, preferably a cutting chain, designed to minimise the waste resulting from imperfections, and intended to produce chains of considerable length substantially free of defects.

BRIEF DESCRIPTION OF THE DRAWINGS

The object of this invention will now be described in detail, with the help of the accompanying drawings, wherein.

DETAILED DESCRIPTION OF THE PREFERRED EMBODIMENT(S)

The above objectives are achieved by a method of manufacturing a chain 1, preferably a cutting chain for a chain saw, comprising the steps of:

a) providing or pre-assembling a plurality of chain sub-units 10;

b) testing at least a sufficient property and/or a sufficient functionality of each chain sub-unit 10;

c) combining with a head-to-tail coupling the plurality of chain sub-units 10 provided with the sufficient property or sufficient functionality of step b), to make a chain 1 of a predefined length.

It follows that, innovatively, only the chain sub-units adequately conforming to one or more properties/functionalities will be incorporated into the growing chain, and this will result in the manufacture of a qualitatively performing chain.

In fact, the testing step may be performed on one or more desired properties/functionalities and, as the number and precision of the tests performed on the related sub-units increases, defects in the chain will decrease.

Therefore, preferably, step b) may be followed by a step of discarding one or more chain sub-units 10 lacking or insufficiently provided with said property and/or functionality, so that these are excluded from incorporation in the chain 1 by means of step c).

Figure 1:
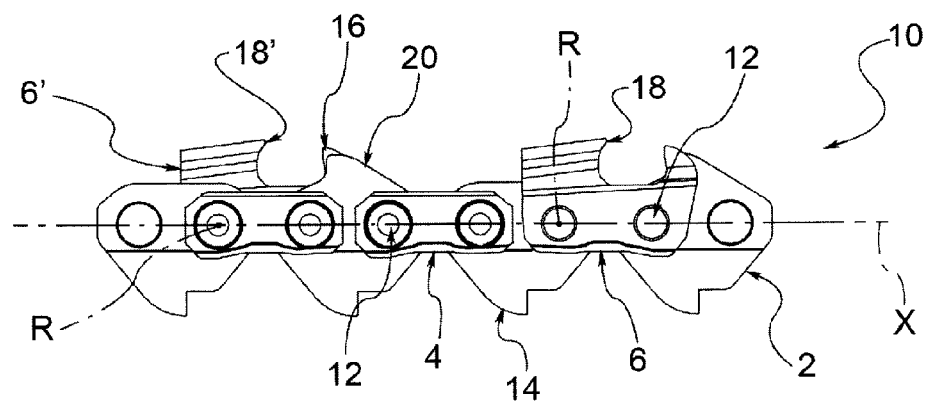
FIGS. 1 and 2 show a chain sub-unit, according to a possible embodiment of this invention, respectively in side view and in exploded view along the axes of rotation between the links wherein, in FIG. 2, the pivot pins are omitted and the links are represented in plan view for greater clarity.

A chain sub-unit 10 is for example shown schematically in FIG. 1. This figure shows a cutting chain provided as an example of a chain obtained with this method. This should not be considered as limiting the scope of this invention.

The cutting chain illustrated corresponds to an advantageous variant, since it presents the greatest possible number of cutting components.

Other variants may, however, provide for sub-units of longer chains and/or with the related cutting edges distributed on a greater linear number of links and/or, as mentioned, sub-units without cutting edges.

According to a particularly preferred embodiment, each sub-unit is realised with the sub-steps of:

i) providing a plurality of drive links 2 and connection links 4, and optionally also a plurality of cutting links 6, 6' having symmetrical cutting edges 18, 18', where each of such links 2, 4 (and optionally 6, 6') identifies at least one pair of through holes 8, 8" (optionally 8');

ii) placing the drive links 2 alongside each other in a chain-extension direction X;

iii) for each pair of adjacent drive links 2, arranging in a bridging manner and on both sides, at least one connection link 4 (and optionally, in the presence also of cutting links 6, 6', a connection link 4 and a cutting link 6, 6'), so that the lumina of the through holes 8" (possibly 8') of the links 4 (possibly 6', 6") arranged as a bridge are at least partially aligned with the lumina of the through holes 8 of the drive links 2;

iv) constraining the drive links 2, the connection links 4 (and possibly the cutting links 6, 6') in the chain-extension direction X, by means of a plurality of pivot pins 12 housed in the through holes 8, 8" (possibly 8') with the partially aligned lumina, with the possibility of rotation of the links 2, 4 (optionally 6, 6') around axes R identified by said pins.

Preferably, each of the links discussed is in the form of a metal plate, for example with a very thin thickness with respect to its height and/or width.

According to an embodiment, one or more drive links 2 may comprise a transmission shank 14, insertable in a guide groove of a bar of the chain saw and movable by means of a pinion placed at one end of said bar.

In other words, the rotary motion of the pinion is transmitted to the cutting chain by means of the aforesaid shank 14, preferably present on each drive link, so that the links are moved along said bar.

Advantageously, one or more drive links 2 comprise an apex 20, for example pointed and/or tapered, specifically on the opposite side relative to the transmission shank 14. Optionally, the transmission shank 14 could be pointed and/or tapered.

According to a further embodiment, the connection links 4 are substantially or generally of rectangular shape.

Advantageously, at least a pair of connection links separates the optional cutting links 6, 6' in the chain-extension direction X. Such a variant is for example schematically shown in FIG. 2, where the pair of connection links 4 that separates the cutting edges is substantially aligned along at least one rotation axis R.

According to a further variant, two or more pairs of connection links 4 may separate the optional cutting links 6, 6', for example in the manufacture of economical cutting chains that provide for a reduced linear concentration of allochiral cutting edges.

With regard to the cutting links 6, 6', in this description, the term "allochiral" means—specifically—cutting edges with reciprocal inverse symmetry. Such symmetry is present between such a right cutting edge 18 and a left cutting edge 18' in the aforesaid links 6, 6'.

According to the embodiment shown, the allochiral cutting edges 18, 18' of the cutting links 6, 6' are mounted along each chain sub-unit 10 (consequently along the cutting chain 1), with an orientation such as to create an alternation of right and left cutting edges 18, 18' in the chain-extension direction X.

Optionally, one or more cutting links 6, 6' may comprise a depth-delimiting projection 16, positioned between a vertex of the respective cutting edge 18, 18' and the apex 20 of the drive link 2.

In this way, the depth-delimiting projection 16 protects the drive link 2 from shocks, and prevents the cutting edges from sinking excessively in a material to be separated, for example the wood of a tree trunk.

Advantageously, in the chain sub-unit 10, the through holes 8, 8" (possibly 8') are substantially aligned along the chain-extension direction X. Preferably, the extension axis of such holes—preferably coinciding with the rotation axis R—is orthogonal to the axis X.

With regard to sub-step iii), the pair of connection links 4, optionally the connection link 4 and the respective cutting link 6, 6', are preferably spaced apart through the thickness of the drive links 2.

In this way, during use of the chain 1, the drive link 2 is guided in its movements by the adjacent links, while the latter are dragged or pushed by the drive link 2.

Preferably, the lumina of the through holes are substantially aligned/centred with each other, so as to be engaged by common pivot pins 12.

For example, the pivot pins 12 may be cylindrical or at least partly tubular.

According to a variant, the sub-step iv) comprises a step of riveting one or both axial ends of the pivot pins 12, or a step of welding at least one axial end of the pivot pins 12 to a connection link 4 and/or to a cutting link 6,6'.

In other words, the aforesaid constraint may occur by mechanical deformation of the aforesaid axial ends of the pins 12 (for example by means of a rotary tool), or by means, preferably, of laser welding.

Preferably, all riveting steps are all performed in the same direction, for example from top to bottom with respect to a vertical direction.

For example, the testing step could take place, at least partially, simultaneously with the constraint sub-step.

According to a variant, step b) may comprise a testing step, either directly or indirectly, after the constraint of the pivot pins 12.

For example, this constraint may be determined by the actual number of revolutions of the spindle delegated to this operation.

According to a further variant, step b) may comprise a step of measuring a desired deformation of an axial end (in particular of a head) of the pivot pins 12. For example, such a measurement could be made by means of a camera or a video camera, optionally digital.

According to a still further variant, step b) may comprises a step of testing the rotation ability of the links 2, 4, 6, 6' around the axes of rotation R of said pivot pins 12.

Merely by way of example, the chain sub-units 10 may could be conducted along a simulated path—for example reproducing the passage in a chain saw bar—in order to determine whether the joints around the rotation axes are functioning. Or if some links are mutually partially blocked, for example by virtue of a riveting of the pivot pins performed too energetically.

According to a preferred embodiment, the step of testing rotation ability comprises steps of:

moving the axial ends of the chain sub-units 10 together along or parallel to the chain-extension direction X to misalign the plurality of pivot pins 12;

acquiring an image of the actual deformation of the chain sub-unit 10 deriving from said misalignment of the pins;

comparing the image of said actual deformation with one or more template images, intended for sub-units provided with the sufficient property/functionality.

In other words, an axial compression of a chain sub-unit 10 causes rotations of the aforesaid links around their respective rotation axes R, for which such sub-unit will be deformed with respect to the starting condition, preceding the moving together of the axial ends.

The deformation mode will be different depending on whether or not the sub-unit has the required property/functionality.

In the first case, the image of the actual deformation will conform (optionally within certain tolerances) to one of the template images, the latter being graphical representations of the shapes that are expected for a chain sub-unit functioning in an acceptable or correct manner.

Otherwise, for example in the case in which the rotation of the links around one or more pivot pins is somehow blocked, the actual deformation of the chain sub-unit will be dissimilar to all the template images, for which that sub-unit will be considered defective. In such circumstance, the sub-unit will not be incorporated in the chain 1.

For example, the image of the actual deformation could be acquired by camera or video camera, optionally digital.

Figure 3:
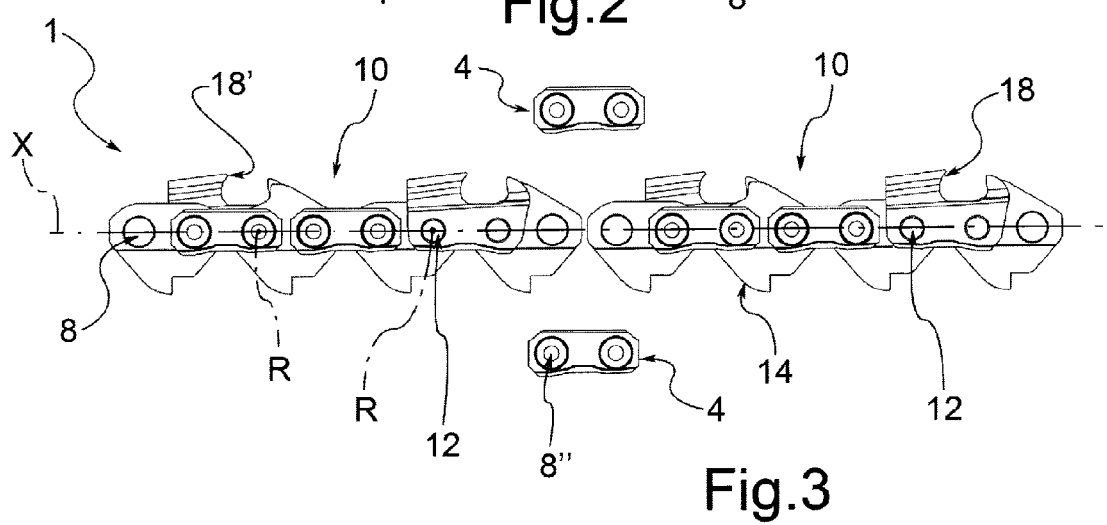
FIG. 3 illustrates a step of reciprocally joining a plurality of chain sub-units according to FIG. 1, to create a chain of predefined length.

According to a preferred variant (for example schematically shown in FIG. 3), step c) comprises a step of arranging in a bridging manner and on both sides of each pair of chain sub-units 10 a pair of connection links 4 and connecting in an articulated manner the connection links 4 and the chain sub-units 10 by means of further pivot pins housed in respective through holes 8, 8″.

According to a variant not shown, step c) may comprise a step of arranging in a bridging manner and on both sides of each pair of chain sub-units 10 a pair of connection links 4 and a cutting link 6, 6′ and connecting in an articulated manner the bridging links 4, 6, 6′ and the chain sub-units 10 by means of further pivot pins housed in respective through holes 8, 8′, 8″.

Advantageously, the method may comprise a step of closing in a loop the chain 1 of the predefined length by joining the first and the last drive link 2 of said chain.

According to a variant, the step of closing in a loop could be achieved through the use of connection links 4, or a connection link 4 and a cutting link 6, 6′, as discussed in relation to the preceding step c).

This invention further concerns a chain sub-unit 10 made according to preceding step a) and tested according to step b) of the method according to any one of the embodiments discussed above, and a machine 20 for the implementation of the aforesaid method.

Figure 4:
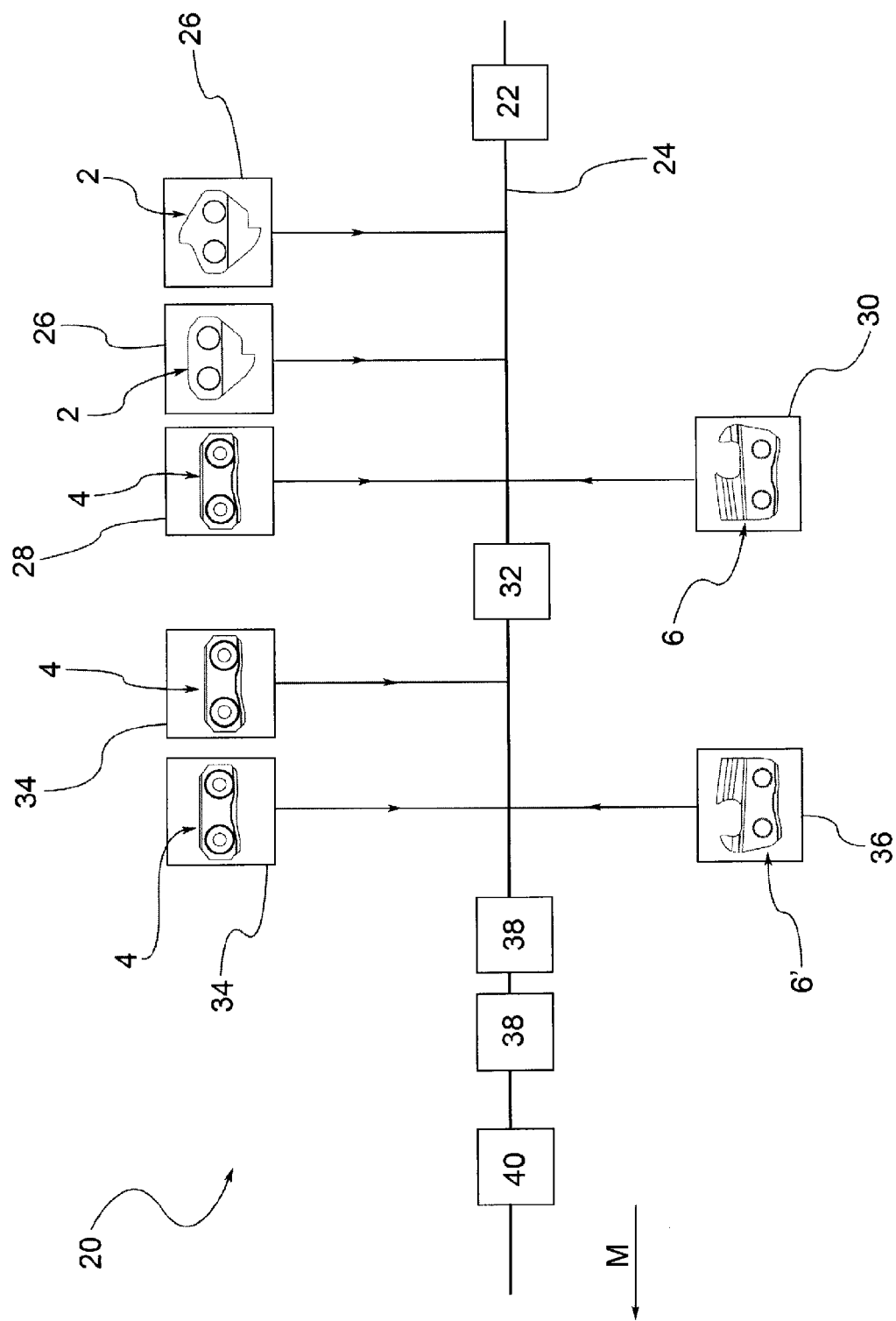
FIGS. 4 and 5 represent different areas of a single machine layout, according to a possible variant, for the implementation of the method covered by this invention, where the manufacture of first the sub-unit and then the chain, develops starting from FIG. 4 according to the numbering of the figures, in particular in the assembly direction indicated by the letter M.
Figure 5:
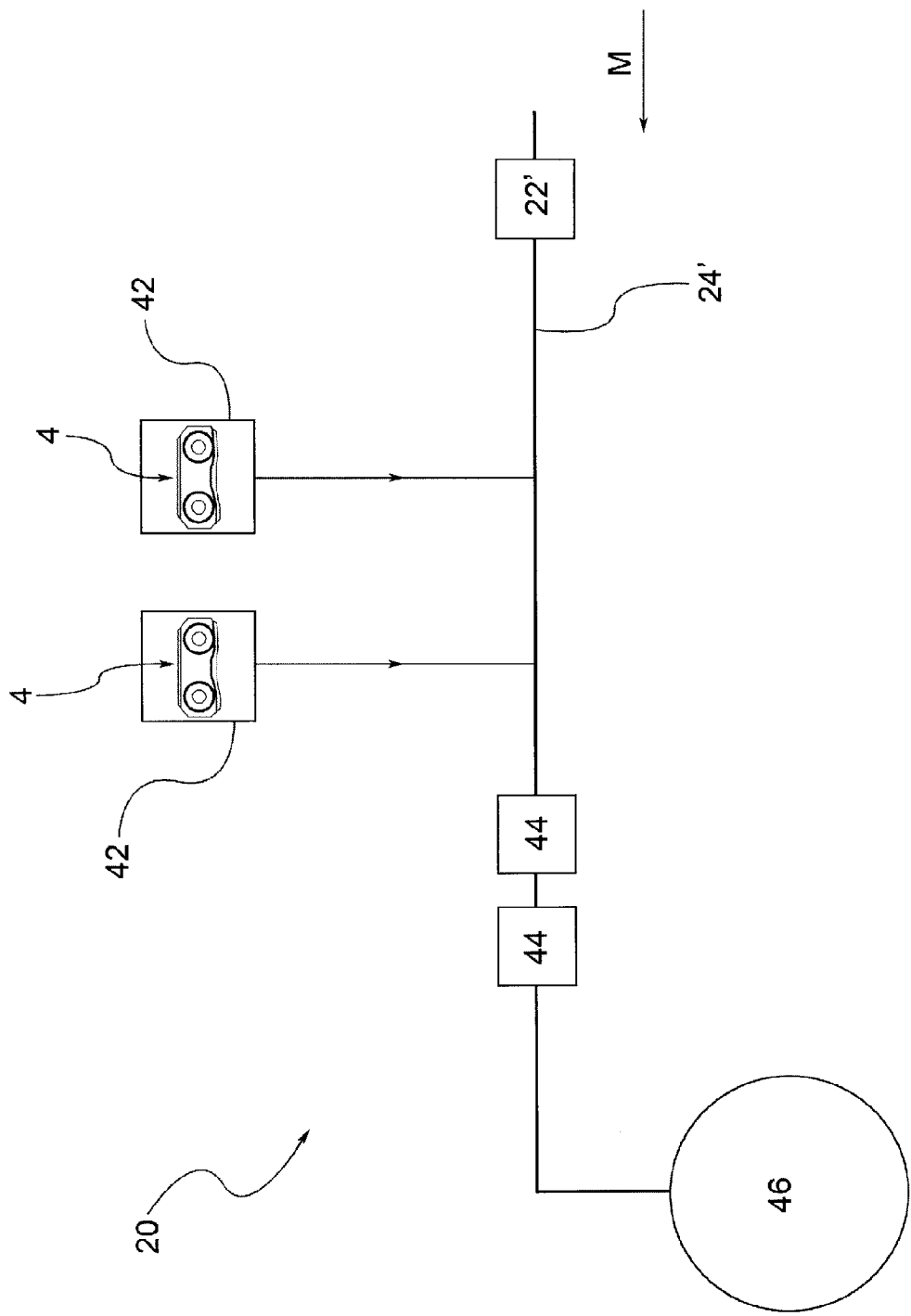

With regard to such a machine, reference is made, for example, to the schematic of FIGS. 4-5, provided purely by way of non-limiting example.

Figure 2:
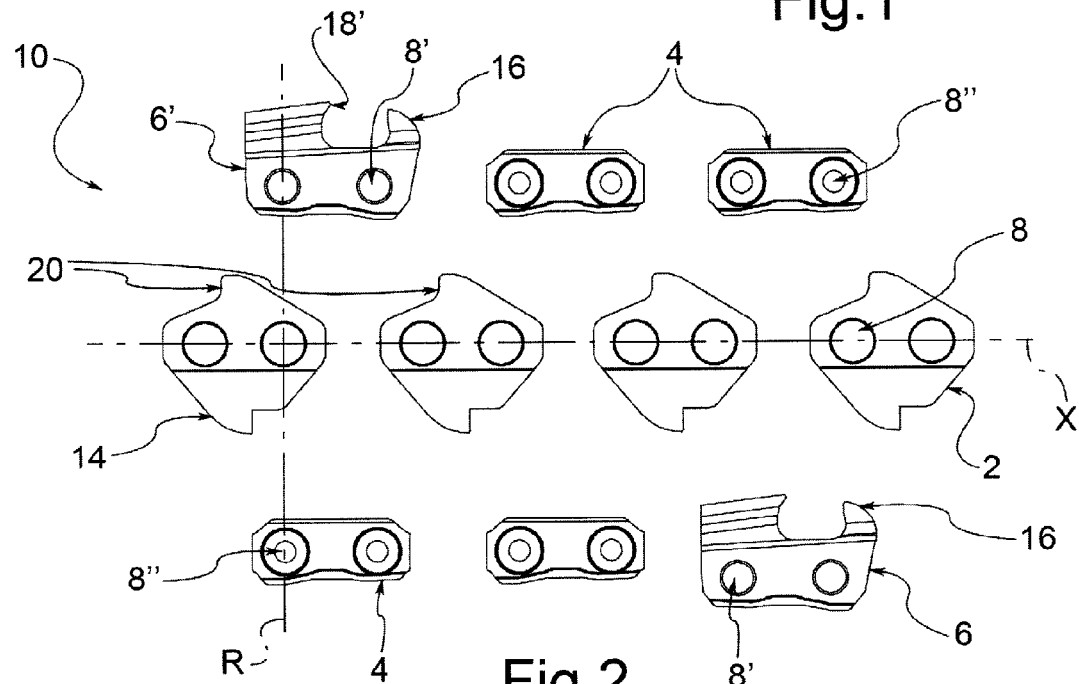

The machine discussed is configured for the manufacture of the chain sub-units 10 schematised in FIGS. 1 and 2, therefore, each comprising four drive links, four connection links and two cutting links with allochiral cutting edges. This, as was said, should not be considered as limiting the scope of this invention.

The machine 20 comprises a carriage 22 (only shown schematically in FIG. 4), movable along a translation guide 24 in the assembly direction M, in order to compose each chain sub-unit.

By means of the first link feeders 26, 28, 30 (FIG. 4), the carriage is engaged with the plurality of drive links 2 (four in number, through the feeders indicated with the number 26) and to these are associated two connection links 4 (by means of feeder 28) and one cutting link 6 (feeder 30).

Preferably, these connection links 4 comprise pivot pins placed in each through hole at one end of the pin.

The association of connection links and cutting links takes place in such a way that the lumina of the through holes 8′ of the cutting link align with the lumina of the through holes 8 of the driving links, and in such a way that the pivot pins protruding from the connection links penetrate into the through holes 8 of the drive links.

In successive stations, second link feeders 34, 36 provide two other connection links (by means of the feeders 34) and a cutting link 6′ (feeder 36), so as to arrange them to bridge the drive links positioned previously, inserting them into the pivot pins already present.

Before this operation can be done, it is necessary that the carriage 22 reverse the arrangement of the links previously placed (for example through a rotary support), holding them in position with suitable means by virtue of the provisional arrangement of the links arranged previously, in such a way that the drive links are accessible from a surface opposite to the one visible in FIG. 2.

In this regard, the drive links may be attached cantilevered to the carriage 22, so that the reversal of the arrangement makes accessible the area of the drive links on which the other links will be assembled.

Preferably, these connection links 4 coming from the link feeder 34 downstream comprise pivot pins placed in each through hole at one end of the pin.

The connection links provided by means of the feeders 34 are superimposed respectively on the cutting link 6 and a previous connection link (centrally arranged in the representation of FIG. 1), while the cutting link 6′ fed by the feeder 36 is placed substantially aligned to one of the connecting links provided by means of the feeder 28.

In at least a first pin-locking station 38, the pivot pins are anchored in an irreversible manner in the chain sub-unit thus produced, since the other end of the pin still free is locked or deformed. This provides an axial retention along the chain-extension axis X and a rotation around the rotation axes R.

For example, these pins are riveted in the through holes by the use of one or more rotating spindles.

At this point, the chain sub-unit is taken from the carriage 22 and placed in a test station 40.

The test station 40 establishes the suitability of the chain sub-units 10 to be incorporated in the cutting chain 1, in particular by testing the sufficient property and/or functionality.

The test station 40 may reject chain sub-units lacking or insufficiently provided with the property and/or functionality.

Finally (FIG. 5), the suitable chain sub-unit is engaged in a further carriage 22′, translatable along a further translation guide 24′.

Successive third link feeders 42 provide the connection links between the chain sub-units 10 that have passed the preceding test step, and at least one second pin-locking station 44, arranged upstream provides to constrain the various sub-units 10 by means of other pivot pins to obtain the chain 1 of predefined length.

Finally, the chain 1 may for example be would in one or more coils at a coiling station 46.

Innovatively, the method described brilliantly overcomes the drawbacks noted in relation to the prior art.

More precisely, by means of the claimed method, any possible inaccuracies or defects of assembly can be detected early and in particular, before the incorporation of the sub-units in the chain.

This allows preventing one or more defective sub-units from becoming part of the structure of the chain, so the chain generated by this method is certain to have all the necessary properties and/or functionalities that were tested, or the sole property/functionality checked.

Advantageously, the method covered by this invention is extremely simple, so it can be implemented in any existing production line.

Advantageously, the method covered by this invention is extremely safe from the functional point of view since the devices described ensure reliability and long-lasting precision.

Advantageously, the method covered by this invention allows avoiding the entry of impurities resulting from riveting in the through holes.

To the embodiments of the aforesaid method, machine and chain subunits, one skilled in the art, in order to meet specific needs, may make variants or substitutions of elements with others functionally equivalent.

Even these variants are contained within the scope of protection, as defined by the following claims.

Moreover, each of the variants described as belonging to a possible embodiment can be realised independently of the other variants described. 1-11.

The invention claimed is:

1. Method of manufacturing a chain, comprising the steps of:
   a) providing or pre-assembling a plurality of chain sub-units, each sub-unit being made by the sub-steps of:
   providing a plurality of drive links and connection links, each of said links identifying at least a pair of through holes;
   placing the drive links alongside each other in a chain-extension direction;
   for each pair of adjacent drive links, arranging in a bridging manner and on both sides a pair of connection links so that lumina of the through holes of the connection links arranged in a bridging manner are at least partially aligned with lumina of the through holes of the drive links;
   constraining the drive links and the connection links in the chain-extension direction, by a plurality of pivot pins housed in the through holes with the partially aligned lumina, allowing rotation of the links around axes identified by said pins;
   b) testing at least a sufficient property and/or a sufficient functionality of each chain sub-unit;
   c) combining with a head-to-tail coupling the plurality of chain sub-units provided with the sufficient property and/or sufficient functionality of step b), to make a chain of a predefined length.

2. Method according to claim 1, wherein the step b) comprises a step of testing, either directly or indirectly, whether the pivot pins have been constrained, and/or a step of detecting a desired deformation of an axial end of the pivot pins.

3. Method according to claim 2, wherein the step b) comprises a step of testing the rotation ability of the links around the rotation axes of said pivot pins.

4. Method according to claim 3, comprising the steps of:
   moving the axial ends of the chain sub-units together along or parallel to the chain-extension direction to misalign the plurality of pivot pins;
   acquiring an image of the actual deformation of the chain sub-unit deriving from said misalignment;
   comparing the image of said actual deformation with template images, adapted for sub-units provided with the sufficient property/functionality.

5. Method according to claim 1, wherein the constraining step comprises a step of riveting one or both axial ends of the pivot pins, or a step of welding at least one axial end of the pivot pins to a connection link.

6. Method according to claim 1, wherein:
   the step of providing a plurality of links comprises a step of further providing cutting links having allochiral cutting edges;
   each of said links identifying at least a pair of through holes; and for each pair of said adjacent drive links, said method comprises a step of arranging in a bridging manner and on both sides at least one connection link and at least one cutting link, so that the lumina of the through holes of the links arranged in a bridging manner are at least partially aligned with the lumina of the through holes of the drive links;
   said method comprising a step of constraining the drive links, the connection links and the cutting links in the chain-extension direction, by a plurality of pivot pins housed in the through holes with the partially aligned lumina, allowing rotation of the links around axes identified by said pins.

7. Method according to claim 6, wherein the allochiral cutting edges of the cutting links are mounted along each chain sub-unit, consequently along the chain, with an orientation such as to create an alternation of right and left cutting edges in the chain-extension direction.

8. Method according to claim 7, wherein step b) is followed by a step of discarding one or more chain sub-units lacking or insufficiently provided with said property and/or functionality, so that the chain sub-units lacking or insufficiently provided with said property and/or functionality are excluded from incorporation in the chain through step c).

9. Method according to claim 1, wherein step c) comprises a step of arranging in a bridging manner and on both sides of each pair of chain sub-units a pair of connection links and to connect in an articulated manner the connection links and the chain sub-units by further pivot pins housed in respective through holes.

10. Method according to claim 1, comprising a step of closing in a loop the chain of the predefined length by joining a first drive link and a last drive link of said chain.

11. Method according to claim 1, wherein:
   one or more drive links comprise a transmission shank, suitable for being inserted in a guide groove of a bar of the chain saw and movable by a pinion placed at one end of said bar; and/or
   at least one pair of connection links separates the cutting links in the chain-extension direction, said pair of connection links being distanced through the thickness of the drive links; and/or
   one or more cutting links comprise a depth-delimiting projection, positioned between a vertex of the respective cutting edge and an apex of the drive link.

12. Chain sub-unit made according to step a) and tested according to step b) of the method according to claim 1.

13. Machine for carrying out the method according to claim 1.

* * * * *